Feb. 22, 1927.
J. WENZIN
PORTABLE FENCE
Filed April 9, 1925
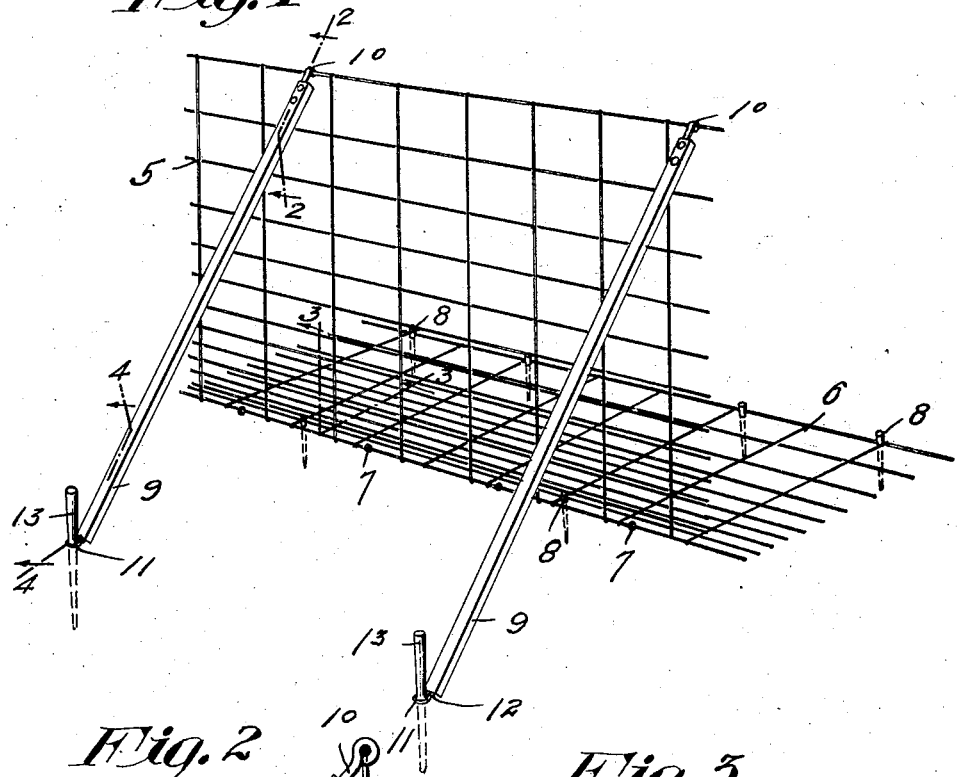
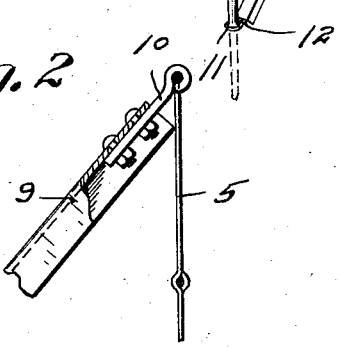
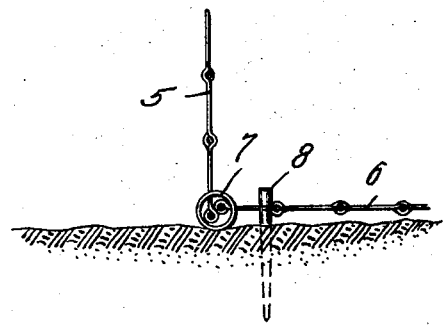
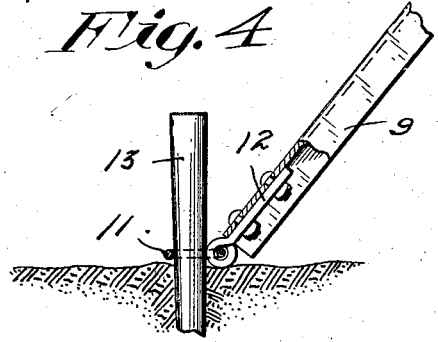
Inventor
John Wenzin
By his Attorneys Patented Feb. 22, 1927.

1,618,739

UNITED STATES PATENT OFFICE.

JOHN WENZIN, OF TYLER, MINNESOTA.

PORTABLE FENCE.

Application filed April 9, 1925. Serial No. 21,812.

My invention has for its object to provide a portable fence that can be easily moved from place to place to enclose a new pasture for pigs or other animals that are likely to burrow under the fence, and which fence is also well adapted for poultry.

To this end, generally stated, the invention consists of the novel devices and combinations of devices hereinafter described and defined in the claim.

In the accompanying drawings, which illustrate the invention, like characters indicate like parts throughout the several views.

Referring to the drawings:

Fig. 1 is a fragmentary perspective view of the improved fence:

Fig. 2 is a fragmentary detail view with some parts sectioned on the irregular line 2—2 of Fig. 1;

Fig. 3 is a detail view with some parts sectioned on the line 3—3 of Fig. 1; and Fig. 4 is a detail view with some parts sectioned on the line 4—4 of Fig. 1.

The numeral 5 indicates a woven wire fence, the vertical members of which have sufficient rigidity to hold the fence upright. A woven wire apron 6 is hingedly connected to the bottom of the fence 5 by wings 7 and arranged to lay flat on the ground inside of said fence. Inner and outer rows of stakes 8 are driven into the ground through the meshes in the apron 6 to hold the same from being shifted about on the ground and also to securely hold the bottom of the fence 5.

The fence 5 is held upright by a plurality of oblique braces 9 which extend outward of said fence, and, as shown, are in the form of channel bars having secured to their upper ends eye-equipped straps 10 through which the upper horizontal member of the fence 5 extends and hingedly connects the braces 9 to the fence 5. Rings 11 are secured to the lower ends of the braces 9 by eye-equipped straps 12, and stakes 13 are inserted through the said rings and driven into the ground to anchor the braces 9 thereto.

To move the fence to a new pasture, it is only necessary to pull up the stakes 8 and 13, lay the fence 5 into its apron 6 and the braces 9 transversely on said fence, and then roll the fence and apron together with the braces 9 within said roll.

What I claim is:

A portable woven wire fence, the uprights of which have sufficient rigidity to stand upright, an apron hingedly attached to the bottom of the fence inside thereof, means for anchoring the apron, to the ground, braces hingedly attached to the top of the fence and extending outward thereof, and means for anchoring the braces to the ground, said fence being adapted to be laid on the apron and said braces laid transversely on the fence and said fence and apron rolled up with the braces in the roll.

In testimony whereof I affix my signature.

JOHN WENZIN.